United States Patent
Zonneveld (10) Patent No.: US 11,454,450 B2
(45) Date of Patent: Sep. 27, 2022

(54) THREE-WAY HEAT EXCHANGER SYSTEM FOR AUXILIARY POWER UNIT

(71) Applicant: HONEYWELL INTERNATIONAL INC., Morris Plains, NJ (US)

(72) Inventor: Paul Zonneveld, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 398 days.

(21) Appl. No.: 16/226,200

(22) Filed: Dec. 19, 2018

(65) Prior Publication Data

US 2020/0200481 A1    Jun. 25, 2020

(51) Int. Cl.
| | |
|---|---|
| F28D 7/00 | (2006.01) |
| F28F 27/02 | (2006.01) |
| F28D 7/10 | (2006.01) |
| F28F 1/40 | (2006.01) |
| F28D 21/00 | (2006.01) |

(52) U.S. Cl.
CPC ......... *F28D 7/0083* (2013.01); *F28D 7/0066* (2013.01); *F28D 7/106* (2013.01); *F28F 1/40* (2013.01); *F28F 27/02* (2013.01); *F05D 2220/32* (2013.01); *F05D 2260/213* (2013.01); *F05D 2260/607* (2013.01); *F28D 2021/0021* (2013.01); *F28D 2021/0049* (2013.01)

(58) Field of Classification Search
CPC ........ F28F 27/02; F28D 7/106; F28D 7/0066; F28D 7/0083; F28D 9/0093
See application file for complete search history.

(56) References Cited

U.S. PATENT DOCUMENTS

| | | | | |
|---|---|---|---|---|
| 2,731,239 | A * | 1/1956 | Andersen | F28F 9/001 165/299 |
| 3,513,907 | A * | 5/1970 | Hughes | F28D 9/0068 165/206 |
| 4,759,401 | A | 7/1988 | Pfouts et al. | |
| 2001/0040025 | A1 * | 11/2001 | Jurisich | F28F 3/048 165/148 |
| 2006/0180703 | A1 | 8/2006 | Zielinski et al. | |
| 2011/0232293 | A1 * | 9/2011 | Leese | F02C 7/14 60/772 |
| 2012/0048530 | A1 * | 3/2012 | Hagshenas | F28D 7/0066 165/285 |
| 2012/0192589 | A1 * | 8/2012 | Omer | F28D 7/106 62/524 |

(Continued)

FOREIGN PATENT DOCUMENTS

| | | | | |
|---|---|---|---|---|
| CN | 101105373 A | * | 1/2008 | ........ F28D 1/0408 |
| CN | 204285899 U | * | 4/2015 | |

(Continued)

*Primary Examiner* — Eric S Ruppert
(74) *Attorney, Agent, or Firm* — Lorenz & Kopf, LLP (57) ABSTRACT

A heat exchanger system includes a core structure with an oil flow path configured to receive an oil flow. The heat exchanger system also includes a fuel flow path included in the core structure and configured to receive a fuel flow. The fuel flow path is coupled to the oil flow path to allow the fuel flow to receive heat from the oil flow in the oil flow path. Also, the heat exchanger system includes a supplemental airflow path defined at least partly by the core structure and configured to receive a supplemental airflow that receives heat from at least one of the oil flow and the fuel flow.

19 Claims, 6 Drawing Sheets

(56) References Cited

U.S. PATENT DOCUMENTS

| | | | |
|---|---|---|---|
| 2013/0202406 A1 | 8/2013 | Papa et al. | |
| 2014/0083667 A1* | 3/2014 | Yang | F28F 1/003 |
| | | | 165/177 |
| 2016/0298547 A1 | 10/2016 | Ripley et al. | |
| 2017/0131034 A1 | 5/2017 | Ribarov et al. | |
| 2017/0184028 A1* | 6/2017 | Sennoun | F02C 7/12 |
| 2018/0038657 A1* | 2/2018 | Pal | F28D 15/00 |
| 2019/0178585 A1* | 6/2019 | de Bock | C22C 1/0425 |

FOREIGN PATENT DOCUMENTS

| | | | |
|---|---|---|---|
| EP | 0138677 A2 | 4/1985 | |
| EP | 2472067 A1 | 7/2012 | |
| EP | 3187715 A1 | 7/2017 | |
| JP | 2001280864 A | 10/2001 | |
| WO | 2011104878 A1 | 9/2011 | |
| WO | WO-2018016371 A1 * | 1/2018 | F28D 1/053 |

* cited by examiner

THREE-WAY HEAT EXCHANGER SYSTEM FOR AUXILIARY POWER UNIT

TECHNICAL FIELD

The present disclosure generally relates to a heat exchanger and, more particularly, to a three-way heat exchanger for an auxiliary power unit.

BACKGROUND

A heat exchanger may be provided for transferring heat from one fluid to another and for ultimately removing the heat from a system. For example, in the case of an engine, oil may flow through an engine component, then through a first flow path in a heat exchanger, and then back to the engine component. A second, comparatively cooler fluid may also flow through the heat exchanger, removing heat from the first fluid in so doing.

However, conventional heat exchangers may be relatively bulky, heavy, difficult to manufacture, and costly. Accordingly, there is a need for an improved heat exchanger that provides high operating efficiency, that is relatively compact, and that provides manufacturing improvements. Furthermore, other desirable features and characteristics of the present disclosure will become apparent from the subsequent detailed description and the appended claims, taken in conjunction with the accompanying drawings and this background section.

BRIEF SUMMARY

In one embodiment, a heat exchanger system is disclosed that includes a core structure with an oil flow path configured to receive an oil flow. The heat exchanger system also includes a fuel flow path included in the core structure and configured to receive a fuel flow. The fuel flow path is coupled to the oil flow path to allow the fuel flow to receive heat from the oil flow in the oil flow path. Also, the heat exchanger system includes a supplemental airflow path defined at least partly by the core structure and configured to receive a supplemental airflow that receives heat from at least one of the oil flow and the fuel flow.

In another embodiment, a heat exchanger system is disclosed for cooling a first fluid of an apparatus. The heat exchanger includes a core structure including an elongate flow structure. The elongate flow structure extends along an axis from a first end to a second end. The elongate flow structure defines an outer profile of the core structure. The elongate flow structure defines at least one opening through the core structure. Furthermore, the heat exchanger system includes a first fluid flow path included in the elongate flow structure. The first fluid flow path extends along the axis of the elongate flow structure between the first and second end. The first fluid flow path is configured to receive a flow of the first fluid from the apparatus. Moreover, the heat exchanger system includes a fuel flow path included in the elongate flow structure. The fuel flow path extends along the axis of the elongate flow structure between the first and second end. The fuel flow path is configured to receive a fuel flow that receives heat from the first fluid in the first fluid flow path before flowing to the apparatus. Additionally, the heat exchanger system includes a supplemental airflow path defined through the core structure via the at least one opening. The supplemental airflow path is configured to receive an airflow for receiving heat from at least one of the flow of the first fluid and the fuel flow. The heat exchanger system also includes a control system configured to selectively vary the airflow according to a characteristic of at least one of the flow of the first fluid and the fuel flow.

In yet another embodiment, a method of operating a heat exchanger system is disclosed. The method includes detecting a characteristic of at least one of an oil and a fuel flowing in a core structure of the heat exchanger system. The oil flows through the core structure via an oil flow path. The fuel flows through the core structure via a fuel flow path. The fuel flow path is coupled to the oil flow path to allow the fuel to receive heat from the oil in the oil flow path. The method includes receiving, by a processor of a control system, an input corresponding to the detected characteristic. Furthermore, the method includes generating, by the processor, a control signal according to the input. Also, the method includes actuating a valve member according to the control signal to selectively vary a mass flow rate of an airflow that flows through the core structure and receives heat from at least one of the oil and the fuel.

Furthermore, other desirable features and characteristics of the gas turbine engine will become apparent from the above background, the subsequent detailed description, and the appended claims, taken in conjunction with the accompanying drawings.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

The present disclosure provides a heat exchanger system with a three-way heat exchanger configured to receive at least three different fluid flows (e.g., an oil flow, a fuel flow, and an airflow). The heat exchanger may be constructed such that heat transfers from one fluid flow to at least one other fluid flow. Also, the heat exchanger may have different modes, different settings, different controls, and/or a plurality of operational configurations. The operations of the heat exchanger may selectively change based upon current operating conditions.

In some embodiments, the heat exchanger system may receive a flow of a first fluid from another component of a gas turbine engine. For example, the heat exchanger may receive an oil flow (e.g., a flow of hot lubrication oil) from a component of an auxiliary power unit. The heat exchanger may also receive a fuel flow that is used to cool the first fluid. Moreover, the heat exchanger may receive an airflow. The airflow through the heat exchanger system may be selectively adjusted, for example, using a valve member. The adjustments may be selectively controlled by a control system, such as a computerized control system. The control system may adjust the airflow based upon one or more variable characteristics of the first fluid flow and/or the fuel flow.

In some embodiments, the heat exchanger may include a core structure defined by an elongate flow structure (e.g., a pipe, tube, hose, conduit, etc.). The elongate flow structure may extend in various directions along an axis. The elongate flow structure may be arranged to define an outer profile of the core structure as well as one or more openings through the core structure. The opening(s) may define a flow path for the airflow through the core structure. Also, the elongate flow structure may internally define an oil flow path as well as fuel flow path. The oil and fuel flow paths may extend along the axis of the elongate flow structure (i.e., along a so-called "tortuous path") and may be coupled for heat exchange such that the fuel cools the oil as the fluids flow through the core structure. This liquid-to-liquid heat exchange may allow the heat exchanger to operate at high efficiency. Furthermore, the airflow over the core structure may provide further cooling effect, for example, by cooling the fuel flow and/or the oil flow. In some embodiments, the airflow may be selectively provided to supplement the cooling effect as needed. For example, if the oil and/or fuel temperature is low, the control system may adjust the airflow to a lower flow rate (or to a zero or negligible flow rate) through the core structure. Conversely, if the oil/fuel temperature exceeds a temperature threshold, then the control system may automatically increase the flow rate of the air, thereby increasing the cooling effect.

Accordingly, the heat exchanger may provide high operating efficiencies across a broad range of operating conditions. The heat exchanger may also be relatively compact and lightweight. Furthermore, the heat exchanger may provide various manufacturing efficiencies.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the heat exchanger system described herein is merely one exemplary embodiment of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
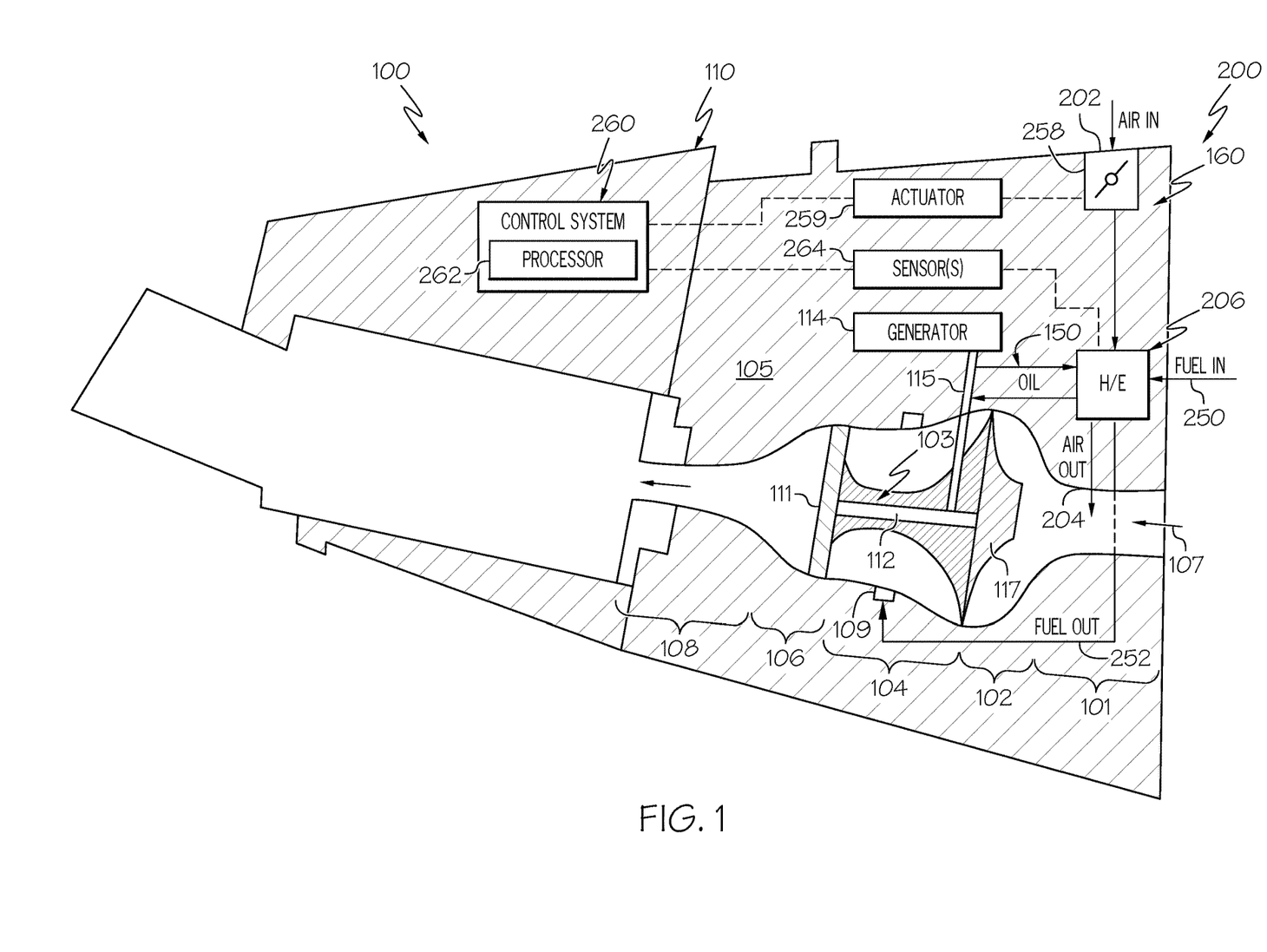
FIG. 1 is a schematic view of a gas turbine engine with a heat exchanger system according to example embodiments of the present disclosure.

Turning now to FIG. 1, a schematic diagram of a heat exchanger system 200 is shown integrated into another system, such as a gas turbine engine 100. The engine 100 may be included on a vehicle 110 of any suitable type, such as an aircraft, rotorcraft, marine vessel, train, or other vehicle, and the engine 100 can provide auxiliary power to the vehicle 110.

It will be appreciated that the heat exchanger system 200 may be used with another machine (other than a gas turbine engine 100) without departing from the scope of the present disclosure. Furthermore, the heat exchanger system 200 may be integrated within and connected to the gas turbine engine 100 in a variety of ways, examples of which will be discussed in detail below. Moreover, the heat exchanger system 200 may be referred to as a "three-way heat exchanger system" in that it receives at least three different fluids, and heat is exchanged between at least two of the fluids. It will be appreciated that the term "three-way heat exchanger system" is used broadly herein and will be interpreted to include heat exchangers that receive three or more different fluids and that provide heat exchange between at least two of those fluids during use.

In some embodiments, the gas turbine engine 100 may comprise an auxiliary power unit (APU) for an aircraft. The heat exchanger system 200 may be useful in an APU because, typically, the fuel consumption requirements of the APU and fuel flow rate are low (e.g., compared to a main engine). However, these characteristics allow the fuel flow to be directed through the heat exchanger system 200 for cooling another fluid in a highly efficient manner. For example, the fuel may be used to cool an oil that lubricates a component of the engine 100.

The engine 100 may generally include an intake section 101, a compressor section 102, a combustion section 104, a turbine section 106, and an exhaust section 108. At least some of these sections may be cooperatively defined by a rotor 103 and an outer structure 105. The rotor 103 may be supported for rotation within the outer structure 105 by one or more bearings. The outer structure 105 may include one or more housing members, support structures, and shroud members which oppose components of the rotor 103 and define an outer radial boundary for fluids moving through the engine 100.

The intake section 101 may receive an intake airstream indicated by arrows 107 in FIG. 1. The rotor 103 may include a compressor wheel 117 disposed within the compressor section 102. The compressor wheel 117 may rotate relative to the outer structure 105 to compress the airstream 107, which is passed to the combustion section 104. Fuel is provided to at least one combustor 109 for igniting an air-fuel mixture within the combustion section 104. The energy from combustion drives a turbine wheel 111 of the rotor 103 within the turbine section 106, and exhaust flows out of the engine 100 via the exhaust section 108.

Rotation of the turbine wheel 111 drives a shaft 112 of the rotor 113, which may provide mechanical power to a generator 114 via an accessory drive 115. The generator 114 may convert this mechanical power (i.e., power from a rotating input shaft) into electrical energy that is provided to one or more electrical systems of the vehicle 110. Also, in some embodiments, the accessory drive 115 (e.g., one or more gear trains) may transfer mechanical power from the rotating shaft 112 to another gas turbine engine of the vehicle 110 for starting the other engine.

The heat exchanger system 200 may include a ducting arrangement 160. The ducting arrangement 160 may include an inlet passage 202 and an outlet passage 204. The heat exchanger system 200 may further include a central unit 206 that is disposed between the inlet passage 202 and the outlet passage 204. The ducting arrangement 160 may direct an airflow through the central unit 206. As represented in FIG. 1, air from the heat exchanger system 200 may outlet to join the airstream 107 within the intake section 101 of the gas turbine engine 100; however, in other embodiments, air from the heat exchanger system 200 may outlet to another location.

The central unit 206 may also be in fluid communication with one or more components of the gas turbine engine 100 via an oil circulation system 150. As shown in FIG. 1, the oil circulation system 150 may fluidly connect the accessory drive 115 and the central unit 206 of the heat exchanger system 200; however, the oil circulation system 150 may fluidly connect the central unit 206 with another lubricated component, such as a bearing of the shaft 112, or another component of the gas turbine engine 100.

Furthermore, the central unit 206 may receive a flow of fuel (e.g., from a tank, fuel pump, or other fuel source) via a fuel input line 250. A fuel output line 252 may extend from the central unit 206 to the combustor 109 of the gas turbine engine 100. As will be discussed, the fuel flow through the central unit 206 may receive heat from (i.e., cool) the oil provided via the oil circulation system 150, and the fuel flow may transfer the heat away from the central unit 206.

Air may flow through the central unit 206 via the ducting arrangement 160 to further increase the cooling effect. Specifically, the airflow may receive heat from the flow of oil and/or fuel for supplementing the cooling effect of the heat exchanger system 200. Ultimately, the oil flowing through the central unit 206 may be transferred to and cooled by the fuel and/or air flowing through the central unit 206.

Moreover, the ducting arrangement 160 may include a valve member 258. The valve member 258 may be provided upstream of the central unit 206 in some embodiments. In some embodiments, the valve member 258 may be a door or panel on the exterior of the aircraft 110, and the valve member 258 may actuate to open and close the door/panel. The valve member 258 may be selectively and automatically actuated by an actuator 259, such as an electric motor or hydraulic actuator. Accordingly, the airflow (e.g., the mass flow rate of the airflow) moving through the central unit 206 may be selectively altered. For example, the airflow may be cut off (i.e., zero mass flow rate) when the valve member 258 is closed, and the airflow may be provided (i.e., a positive mass flow rate) when the valve member 258 is open. Also, the valve member 258 and actuator 259 may be configured such that the valve member 258 may be actuated and retained in a variety of different positions, where the airflow rate to the heat exchanger system 200 is different in each position. As will be discussed, the airflow may be selectively changed to supplement the cooling effect provided by the fuel flow. In additional embodiments, the ducting arrangement 160 may include a fan instead of (or in addition to) the valve member 258. The speed of the fan may be selectively changed (e.g., between an off position, a low speed, and a high speed) to change the airflow through the central unit 206.

Figure 2:
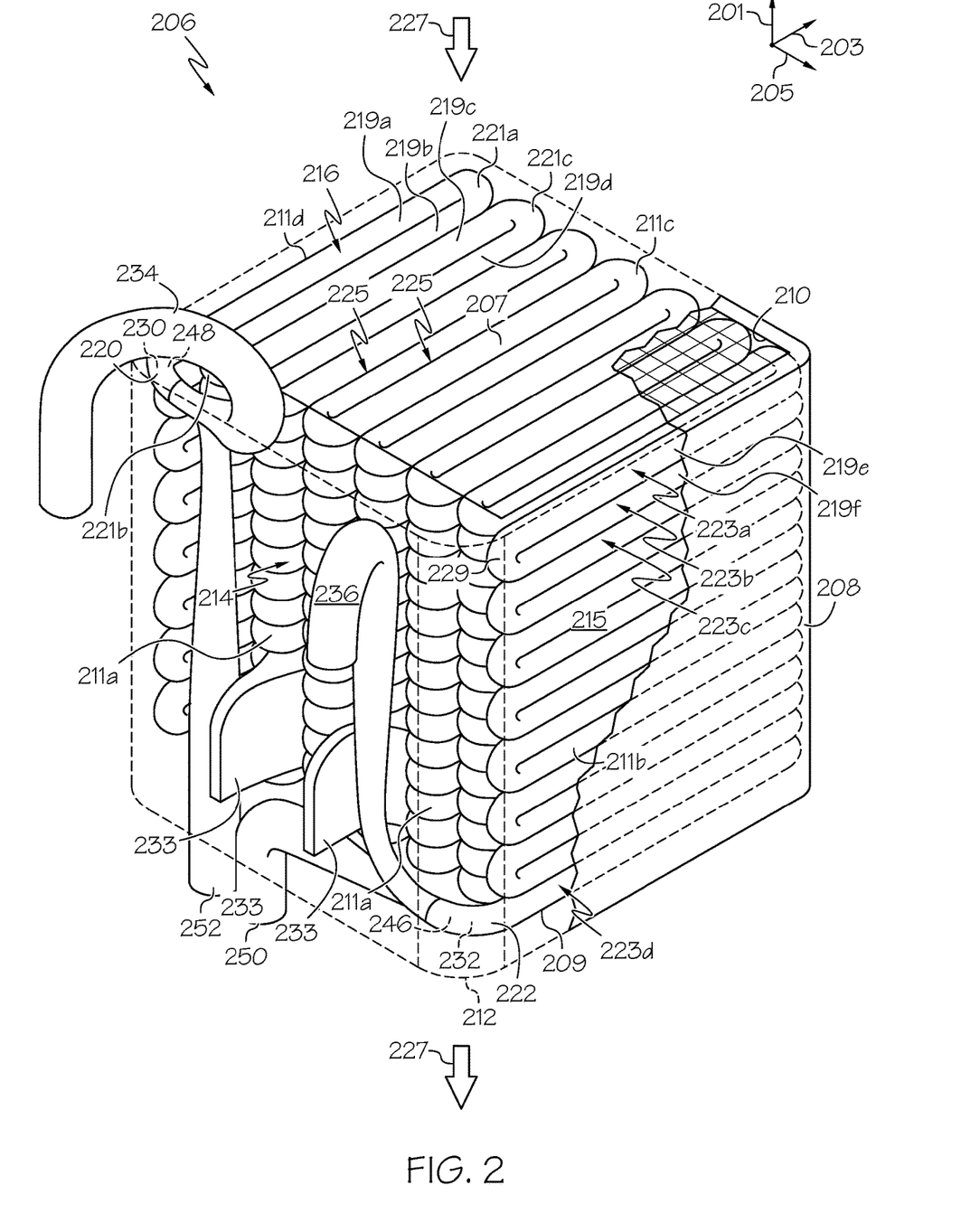
FIG. 2 is a perspective view of a heat exchanger system of the gas turbine engine of FIG. 1.

Referring now to FIG. 2, the central unit 206 of the heat exchanger system 200 is shown in greater detail according to example embodiments. A Cartesian coordinate system with a first axis 201, a second axis 203, and a third axis 205 orthogonally arranged is shown for purposes of reference. In some embodiments, the first axis 201 indicates a normally vertical direction (e.g., directed along the force of gravity) whereas the second and third axes 203, 205 indicate normally horizontal directions.

The central unit 206 may generally include an outer casing 208 and a core structure 214 that is received in the outer casing 208. A portion of the outer casing 208 is shown in phantom in FIG. 2 to more clearly show the core structure 214. The central unit 206 may also include one or more support brackets 233 that extend between the core structure 214 and the outer casing 208 and that support the core structure 214 therein.

In some embodiments, the outer casing 208 may be a hollow container with a plurality of relatively thin walls made of metal. In some embodiments, the outer casing 208 may be generally cuboid in shape; however, it will be appreciated that the outer casing 208 may have a variety of shapes (e.g., a rounded and cylindrical shape, etc.) without departing from the scope of the present disclosure. The outer casing 208 may include a first open end defining an air inlet 210 into the outer casing 208. The outer casing 208 may also include a second open end defining an air outlet 212 from the casing 208. In some embodiments, the air inlet 210 and the air outlet 212 may be spaced apart at a distance along the first axis 201, on opposite ends of the outer casing 208. The air inlet 210 and/or the air outlet 212 may be rectangular and substantially aligned along the first axis 201. Furthermore, in some embodiments, the air inlet 210 and/or the air outlet 212 may include a filtering element, such as a screen, a mesh, a porous filter, etc. The air inlet 210 may be fluidly connected to the inlet passage 202 (FIG. 1), and the air outlet 212 may be fluidly connected to the outlet passage 204 (FIG. 1). Accordingly, an airflow path 227 provided by the inlet passage 202 may be partly defined through the outer casing 208, from the air inlet 210 to the air outlet 212.

As stated, the core structure 214 of the central unit 206 may be received within the outer casing 208. An outer profile 215 of the core structure 214 may resemble a three-dimensional shape, such as a cuboid shape, a cylindrical shape, or otherwise. The shape of the outer profile 215 may correspond to that of the outer casing 208. For example, the outer profile 215 of the core structure 214 and the interior of the outer casing 208 may be cuboid in shape, but these components may be cylindrical in other embodiments of the present disclosure.

In the illustrated embodiment, for example, the outer profile 215 of the core structure 214 is generally cuboid so as to define an upper side 207, a lower side 209, and four lateral sides 211a, 211b, 211c, 211d. The upper side 207 may face the air inlet 210, and the lower side 209 may face the air outlet 212. Thus, the upper and lower sides 207, 209 may be separated along the first axis 201, and the lateral sides 211a, 211b, 211c, 211d may extend along the first axis 201. The lateral sides 211a, 211b, 211c, 211d may oppose the side walls of the outer casing 208 and there may be space therebetween to define part of the airflow path 227. There may also be one or more openings 225 through the core structure 214 as will be discussed below, and the openings 225 may define another part of the airflow path 227 of the heat exchanger system 200.

The core structure 214 may be defined by and/or may include an elongate flow structure 216. The elongate flow structure 216 may be a rigid tube, pipe, hose, line, or other conduit. The elongate flow structure 216 may be made out of a rigid thin-walled material that has high heat transfer properties (high heat transfer coefficient). In some embodiments, the elongate flow structure 216 may have an outer surface 217 that is rounded (e.g., circular) in cross section as shown in FIG. 3; however, the outer surface 217 can have other shapes as will be discussed.

The elongate flow structure 216 may include a first end 220 and a second end 222, and the flow structure 216 may extend continuously along a non-linear axis 218 between the ends 220, 222. Generally, the elongate flow structure 216 may be compacted within a three-dimensional space that corresponds to the cuboid outer profile 215 of the core structure 214. Portions of the axis 218 may be linear while other portions may turn, bend, and change directions. In some embodiments, the axis 218 may change directions repeatedly throughout the core structure 214. The elongate flow structure 216 may bend and turn inward upon itself in some embodiments.

For example, as shown in FIG. 2, the elongate flow structure 216 may include relatively long and straight runs, such as a first run 219a, a second run 219b, a third run 219c, a fourth run 219d, and so on. The elongate flow structure 216 may also include a plurality of turns, such as first turn 221a, a second turn 221b, a third turn 221c, and so on. In some embodiments, the runs 219a-d may extend substantially parallel to each other and/or substantially parallel to the second axis 203 so as to extend between the opposing lateral sides 211a, 211c of the core structure 214. Also, the runs 219a-219d may lie substantially within a plane defined by the second and third axes 203, 205. The first turn 221a may be a one-hundred eighty degree turn that connects the first and second runs 219a, 219b proximate lateral side 211c as shown in FIGS. 2 and 3. The radius of the first turn 221a may be relatively small such that the outer surface 217 of the first run 219a is directly adjacent, layered on, and/or connected to the second run 219b. The second turn 221b may be similar except that it may connect the second run 219b and the third run 219c proximate the lateral side 211a. The outer surfaces 217 of the second and third runs 219b, 219c may be directly adjacent, layered on each other, and/or connected. The third turn 221c may connect the third run 219c and the fourth run 219d, and so on continuously in this back-and-forth pattern until a fifth run 219e that is disposed proximate the lateral side 211b. Accordingly, the elongate flow structure 216 may be arranged in a first layer 223a. The layer 223a may lie substantially within the plane defined by the second and third axes 203, 205 and may define the upper side 207 of the core structure 214. As shown in FIG. 2, the elongate flow structure 216 may also include a fifth turn 229 that is similar to the other turns 221a-c except that the fifth turn 229 curves within a (vertical) plane defined by the first axis and the second axis 203. The fifth turn 229 may connect the fifth run 219e and a sixth run 219f that is disposed directly underneath the fifth run 219e. From the sixth run 219f, the elongate flow structure 216 may extend back-and-forth in a second layer 223b toward the lateral side 211d, then a third layer 223c, and so on. The layers 223a-223c may be stacked (vertically) along the first axis 201, and in some embodiments, the runs and turns within the different layers 223a-223c may be substantially aligned along the first axis 201. The second end 222 of the elongate flow structure 216 may be included in a fourth layer 223d that substantially defines the lower side 209 of the core structure 214.

Figure 3:
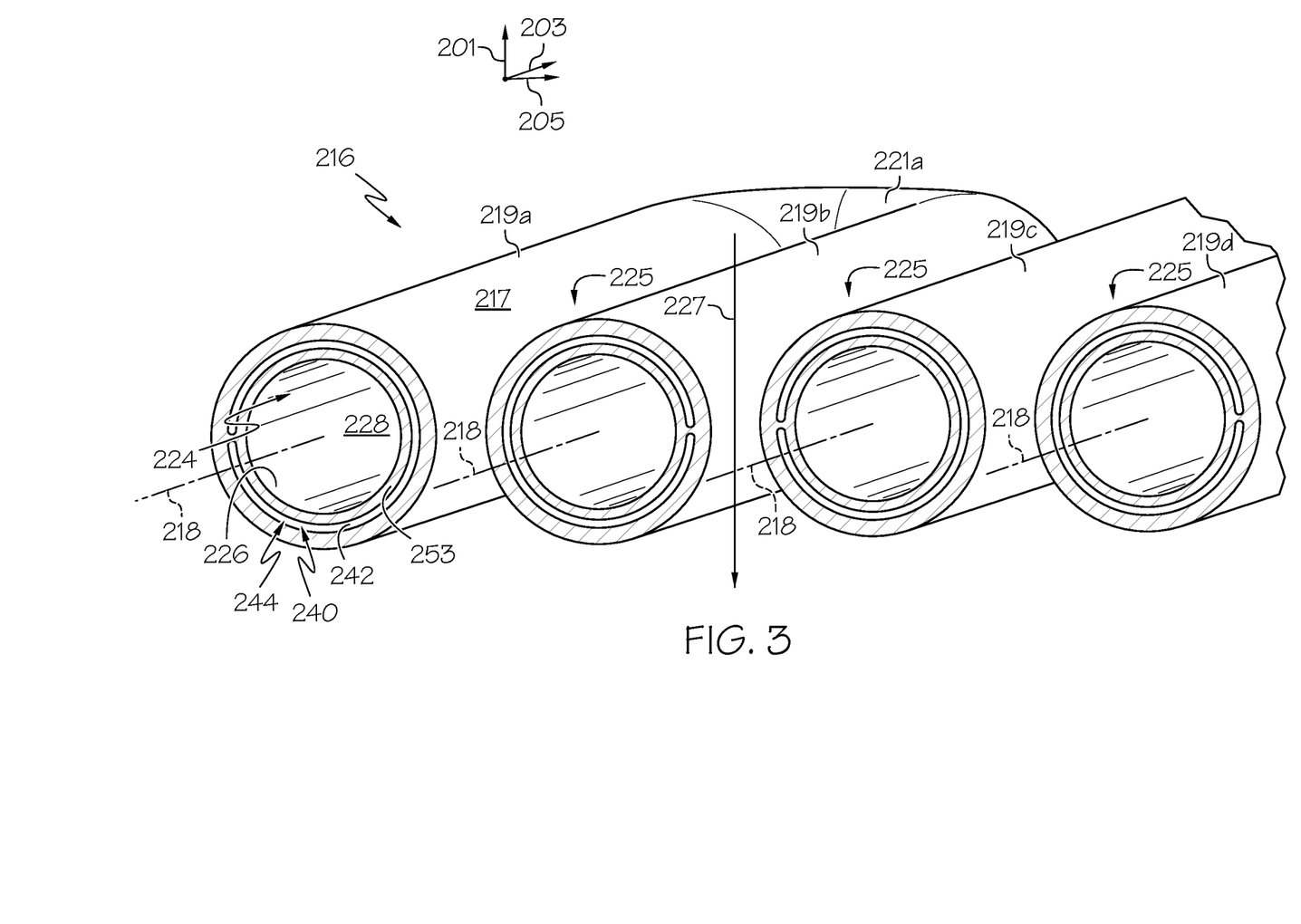
FIG. 3 is a perspective section of a portion of the heat exchanger of FIG. 2.

As shown in FIG. 3, the elongate flow structure 219 may also define one or more openings 225 through the core structure 214. For example, the outer surfaces 217 between neighboring areas of the elongate flow structure 219 may be spaced apart to define openings 225 therebetween. The openings 225 may be fluidly connected between the different layers 223a-223d such that a continuous airflow path 227 is defined through the core structure 214. The airflow path 227 may extend generally along the first axis 201 from the upper side 207 to the lower side 209; however, there may be openings 225 in the core structure 214 that direct the airflow path 227 laterally (i.e., along the second and/or third axes 203, 205) through the core structure 214.

Moreover, as shown in FIG. 3, the elongate flow structure 216 may define one or more internal flow paths, such as an oil flow path 224. The oil flow path 224 may be defined by an inner surface 226 of the elongate flow structure 216. The inner surface 226 may be rounded (e.g., circular) in cross section, and may be substantially centered about the axis 218 in some embodiments. This inner surface 226 may extend continuously along the axis 218 to define an oil passage 228 through the elongate flow structure 216, from the first end 220 to the second end 222. Specifically, as shown in FIG. 2, the oil passage 228 may include an inlet end 220 and an outlet end 232. The inlet end 220 may be disposed proximate the first end 220 of the elongate flow structure 216, and the outlet end 232 may be disposed proximate the second end 222.

As shown in FIG. 2, the core structure 214 may also include an oil input line 234 and an oil output line 236. The input line 234 may be a pipe or tube that extends into and merges with the first end 220 of the elongate flow structure 216, and an internal passage of the input line 234 may be fluidly connected to the inlet end 220 of the oil passage 228. The output line 236 may be similar, but the internal passage of the output line 236 may be fluidly connected to the outlet end 222 of the oil passage 228. Furthermore, the input line 234 and output line 236 may fluidly connect the oil passage 228 to the oil circulation system 150 (FIG. 1) such that the input line 234 supplies oil to the oil passage 228, and the output line 236 receives oil from the oil passage 228.

Additionally, as shown in FIG. 3, the elongate flow structure 219 may include a fuel flow path 240. The fuel flow path 240 may be defined by an inner surface 242 of the elongate flow structure 219. The inner surface 242 may extend continuously along the axis 218 to define a fuel passage 244 through the elongate flow structure 216, from the second end 222 to the first end 220. Specifically, as shown in FIG. 2, the fuel passage 244 may include an inlet end 246 and an outlet end 248. The inlet end 246 may be disposed proximate the second end 222 of the elongate flow structure 216, and the outlet end 248 may be disposed proximate the first end 220.

As shown in FIG. 3, the fuel passage 244 may be C-shaped in cross section and may extend about the axis 218 and about the oil passage 228. In other words, the fuel flow path 240 may at least partly surround or encompass a majority of the oil flow path 224 in the cross section. Thus, as shown in the cross section of FIG. 3, the fuel flow path 240 may be disposed between the oil flow path 224 and the outer surface 217 in a radial direction relative to the axis 218. In the illustrated embodiment, for example, the fuel flow path 240 may be arranged as a jacket (a cooling jacket) for the oil flow path 224. The cross-sectional area of the fuel passage 244 may be considerably smaller than that of the oil passage 228.

However, it will be appreciated that the fuel flow path 240 and/or the oil flow path 224 may be included differently without departing from the scope of the present disclosure. For example, at least one of the paths 240, 224 may be wedge-shaped in cross section. There may multiple paths 240, 224 in a single cross section of the elongate flow structure 216.

The fuel flow path 240 may be connected to and may receive fuel via the fuel input line 250 (FIGS. 1 and 2). As shown in FIG. 2, the input line 250 may include a pipe or tube that extends into and merges with the second end 222 of the elongate flow structure 216 and that supplies fuel to the fuel passage 244. The fuel flow path 240 may also be connected to and may output fuel via the fuel output line 252. As shown in FIG. 2, the output line 252 may extend from and branch from the first end 220 of the elongate flow structure 216.

The oil flow path 224 and the fuel flow path 240 may be arranged in a heat exchanging arrangement within the elongate flow structure 216. For example, the fuel flow path 240 may surround a majority of the oil flow path 224 and may share a common internal wall 253 of the elongate flow structure 216. Accordingly, in some situations, heat may transfer generally radially outward from the oil in the oil flow path 224, through the thickness of the internal wall 253, and into the fuel of the fuel flow path 240. Moreover, the elongate flow structure 216 may include an outer wall 299 disposed radially between the fuel flow path 240 and the outer surface 217. The outer wall 299 may provide another heat transfer medium, in that heat may transfer generally radially outward from the fuel in the fuel flow path 240, through the outer wall 299, and to the air flowing along the airflow path 227.

The heat exchanger system 200 may additionally include a control system 260. In some embodiments, the control system 260 may be a computerized device with a processor 262 with one or more modules that can be used to control operations of the system 200. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

The control system 260 may include and/or may be in communication with one or more sensors 264. The sensors 264 may be configured to detect a characteristic of the oil in the oil flow path 224 and/or a characteristic of the fuel in the fuel flow path 240. For example, the sensor 264 may include a temperature sensor configured to measure the temperature of the oil in the oil flow path 224 and/or the temperature of the fuel in the fuel flow path 240. The sensors 264 may transmit corresponding signals to the processor 262, and the processor 262 may control an actuator 259 of the valve member 258 based on the detected oil and/or fuel temperatures. In some embodiments, the processor 262 may rely on look-up tables stored in a memory element that correlate the current oil/fuel temperatures to a position setting for the valve member 258. Thus, the control system 260 may selectively change and adjust the mass flow rate of the air flowing along the airflow path 227 based on the conditions detected by the sensors 264.

Accordingly, during operations of the gas turbine engine 100, oil may flow, for example, from the accessory drive 115 to the heat exchanger system 200. This oil may flow into the core structure 214 via the input line 234. The oil may flow into the inlet end 230 of the oil flow path 224 of the elongate flow structure 216 and flow therethrough along the axis 218 toward the outlet end 232. The oil may also flow out of the core structure 214 via the output line 236, back to the accessory drive 115 to further lubricate the moving parts therein. Meanwhile, fuel may enter the inlet end 246 of the fuel flow path 240 via the input line 250. The fuel may flow along the fuel flow path 240 along the axis 218 toward the outlet end 248. The fuel may flow out of the core structure 214 via the output line 252 toward the injector of the combustor 109 for fueling ignition within the combustion section 104. Within the core structure 214, heat may transfer from the oil flow to the fuel flow, thereby cooling the oil. Thus, the oil may be maintained at a proper temperature, viscosity, etc. for providing suitable lubrication for the engine 100.

This heat exchange effect may be supplemented by the air flowing along the airflow path 227. For example, the air may flow around and through the core structure 214, thereby receiving heat from the fuel and/or oil flowing within the elongate flow structure 216. The airflow of the airflow path 227 may be used and controlled to supplement the heat exchange effect.

For example, in situations in which the sensors 264 detect that the oil/fuel temperature is below a predetermined threshold, the control system 260 may maintain the valve member 258 in a closed or partially closed position. This may be the normal or neutral position of the valve member 258, and the valve member 258 may be biased toward this position. Thus, the airflow may be provided to the core structure 214 at a relatively low mass flow rate. Accordingly, the heat exchanger system 200 may provide high efficiency using the fuel flow primarily to cool the oil.

However, in situations in which the sensors 264 detect that the oil/fuel temperature exceeds the threshold, the control system 260 may output a control signal to the actuator 259 for actuating the valve member 258 to an open or partially opened position. Thus, the airflow may be provided to the core structure 214 at a relatively high mass flow rate, thereby increasing the cooling effect and removing heat from the system.

The control system 260 may continuously monitor the fuel/oil temperatures and may continuously adjust the position of the valve member 258 accordingly. Thus, in some embodiments, the control system 260 may adjust the airflow provided to the core structure 214 in an effort to maintain the temperatures of the oil and/or fuel below the threshold. Because the cooling effect may be selectively supplemented by the air in the airflow path 227, the size of the core structure 214 and, thus, the size of the overall heat exchanger system 200 may be reduced.

Figure 4:
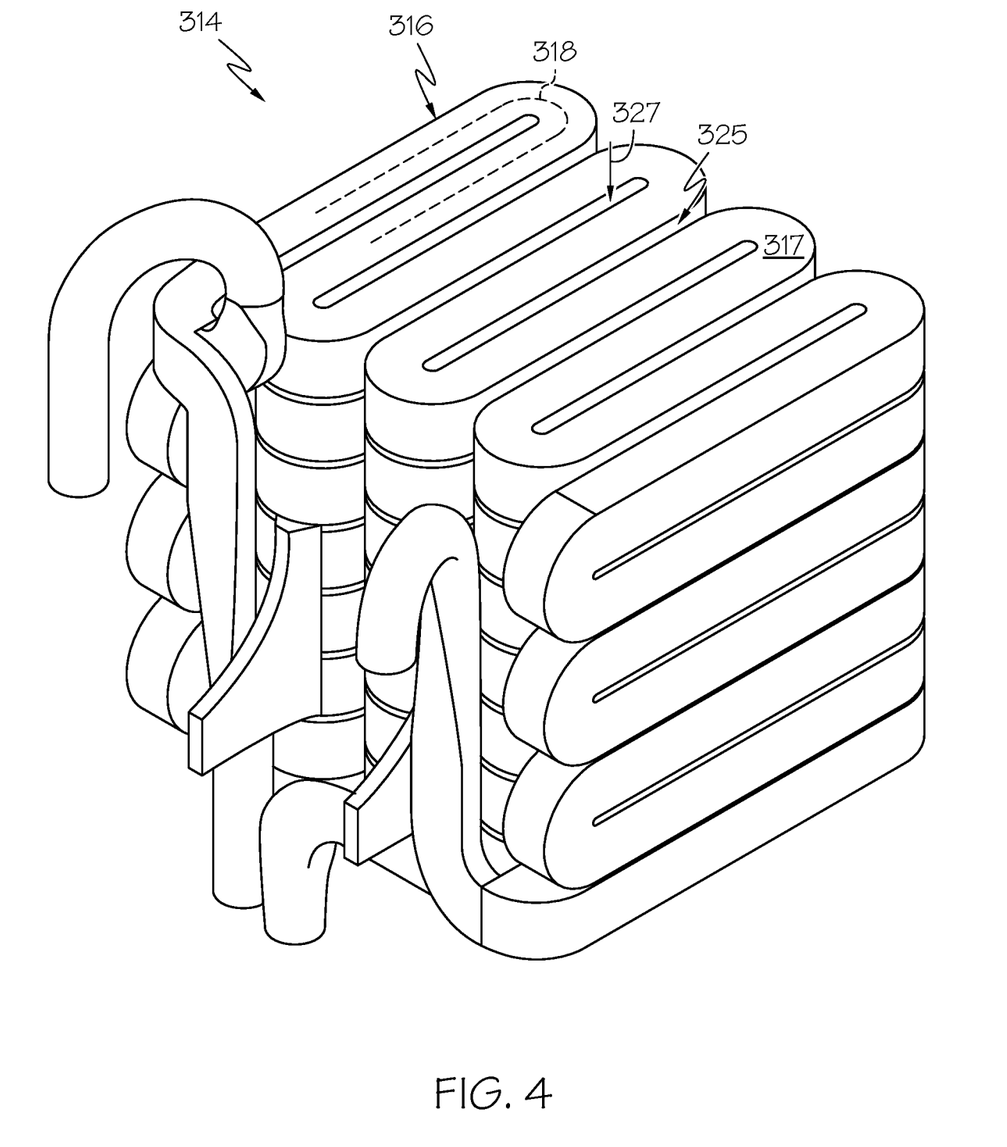
FIG. 4 is a perspective view of the heat exchanger system according to additional embodiments of the present disclosure.
Figure 5:
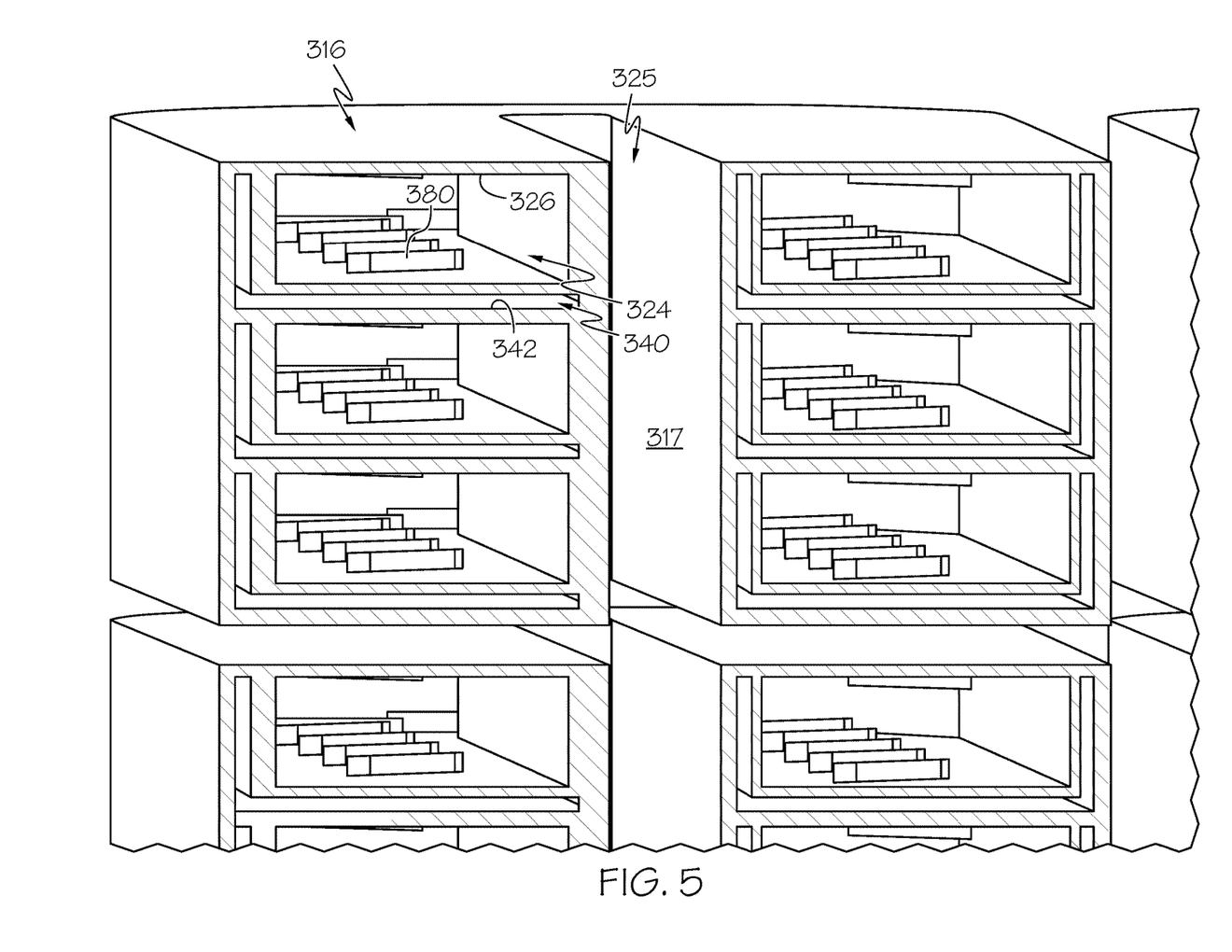
FIG. 5 is a perspective section view of the heat exchanger system of FIG. 4.
Figure 6:
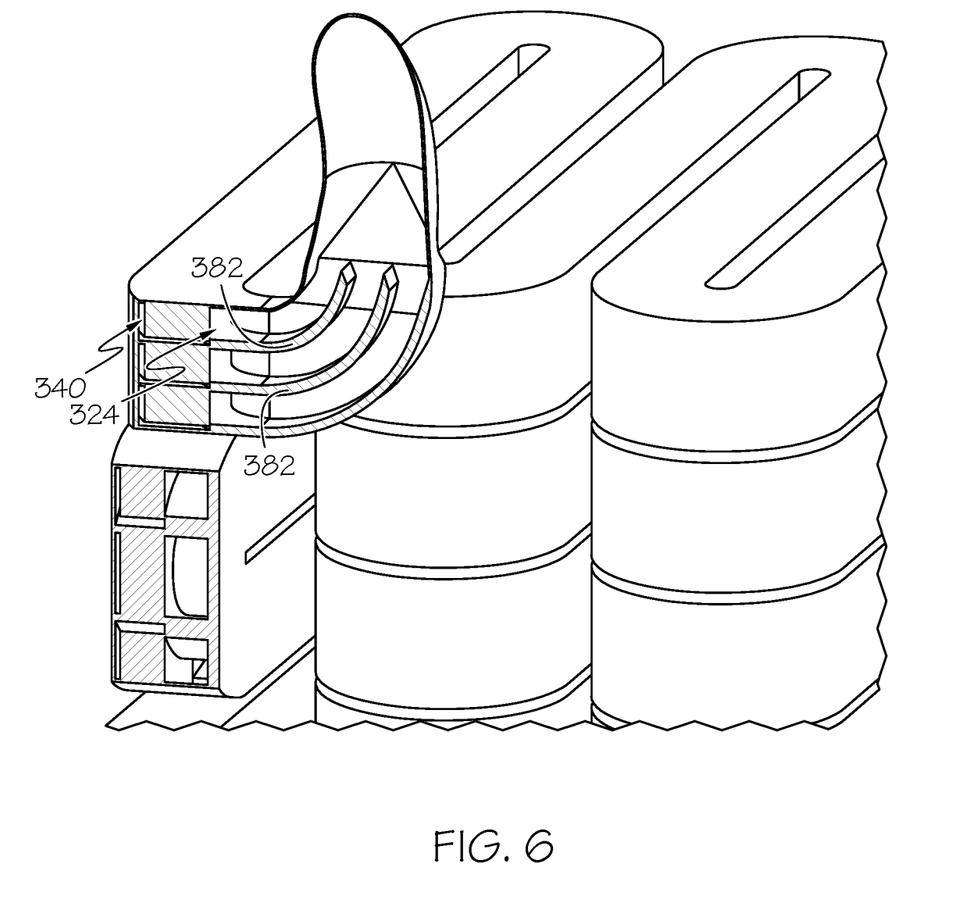
FIG. 6 is a perspective section view of the heat exchanger system of FIG. 4.

Referring now to FIGS. 4, 5, and 6, the core structure 314 is illustrated according to additional embodiments of the present disclosure. The core structure 314 may be substantially similar to the embodiments of FIGS. 2-3 except as noted. Components that correspond to those of the embodiments of FIGS. 2 and 3 are indicated with corresponding reference numbers increased by 100.

As shown in FIG. 5, the outer surface 317 of the elongate flow structure 316 may include at least one flat side. For example, the outer surface 317 may be polygonal (e.g., rectangular) in cross section. Likewise, the oil flow path 324 may include at least one flat side in cross section. The oil flow path 324 may be polygonal (e.g., rectangular) in cross section.

Also, as shown in FIG. 5, the elongate flow structure 316 may include a plurality of turbulators 380. The turbulators 380 may be bumps, posts, rails, fins, or other projections that project from the inner surface 326 into the oil flow path 324. The turbulators 380 may be configured to divert the oil flow, creating turbulence and promoting mixing. As such, the turbulators 380 may increase the heat transfer effect to the fuel flow path 340. The fuel flow path 340 may also be polygonal. For example, the fuel flow path 340 may L-shaped. The fuel flow path 340 may partly surround the fuel flow path 340 in the cross section of FIG. 5. The fuel flow path 340 may extend along two sides of the oil flow path 324.

Furthermore, as shown in FIG. 6, the core structure 314 may also include one or more flow straightener members 382. The flow straightener members 382 may be flat, smooth, and thin walls that extend along the axis 318 within the oil flow path 324. As shown in the illustrated embodiment, there may be three flow separators 382 that are received within the oil flow path 324. The flow separators 382 may separate, divide, and straighten the flow of oil into three separate channels extending along the axis 318.

The heat exchanger system of the present disclosure may be manufactured in various ways without departing from the scope of the present disclosure. For example, the elongate flow structure 216, 316 and/or other portions of the core structure 214, 314 may be constructed using rapid manufacturing techniques, such as additive manufacturing (e.g., 3-D printing). Thus, in some embodiments, the elongate flow structure 216, 316 may be formed as a unitary (one-piece) part, layer-by-layer until completed. As such, the complex shapes, highly contoured surfaces, etc. may be formed with a high degree of precision and efficiency. Also, in some embodiments, the sensors 264 and any associated wiring may be embedded or otherwise attached to the core structure 214, 314 during the additive manufacturing process. In other embodiments, at least part of the elongate flow structure 216, 316 may be extruded. Also, the elongate flow structure 216, 316 may be assembled from a plurality of parts in some embodiments.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:

1. A heat exchanger system comprising:
   a first component configured to be lubricated by oil that flows within an oil system;
   a second component configured to be fueled by fuel that flows within a fuel line;
   a core structure at least partly defined by an elongate flow structure, the elongate flow structure extending along an axis between a first end and a second end, the elongate flow structure being arranged into a plurality of runs along a first direction into rows and in a second direction into a plurality of stacked layers as the elongate flow structure extends between the first end and the second end, the first direction being orthogonal to the second direction, the core structure defining a third direction that is orthogonal to the first direction and the second direction, the first end and the second end separated along the second direction and the third direction;
   an oil flow path that is internal to the elongate flow structure and that extends continuously along the axis and through the plurality of runs from the first end to the second end, the oil flow path fluidly connected to the oil system to receive an oil flow from an oil flow inlet at the first end and deliver the oil flow to an oil flow outlet at the second end;
   a fuel flow path that is internal to the elongate flow structure and that extends continuously along the axis and through the plurality of runs from the second end to the first end, the fuel flow path fluidly connected to the fuel line to receive a fuel flow from a fuel flow inlet at the second end and deliver the fuel flow to a fuel flow outlet at the first end with the fuel flow path and the oil flow path being thermally coupled and separated by a common wall of the elongate flow structure to allow the fuel flow to receive heat from the oil flow in the oil flow path;
   a supplemental airflow path defined at least partly between the plurality of runs and configured to receive a supplemental airflow that receives heat from at least one of the oil flow and the fuel flow.

2. The heat exchanger system of claim 1, wherein the supplemental airflow path is selectively variable according to a characteristic of at least one of the oil flow and the fuel flow.

3. The heat exchanger system of claim 2, further comprising:
   a sensor configured to detect the characteristic; and
   a control system configured to selectively vary the airflow path according to the characteristic detected by the sensor.

4. The heat exchanger system of claim 3, wherein the sensor is a temperature sensor configured to detect a temperature of at least one of the oil flow and the fuel flow;
   wherein the control system is configured to selectively vary the airflow path to increase a mass flow rate of the supplemental airflow when the temperature exceeds a predetermined limit.

5. The heat exchanger system of claim 1, wherein the elongate flow structure includes an outer surface;
   wherein the outer surface at least partly defines the supplemental airflow path; and
   wherein, in a cross section of the elongate flow structure, the fuel flow path is disposed between the outer surface and the oil flow path.

6. The heat exchanger system of claim 5, wherein, in the cross section, the fuel flow path at least partly surrounds the oil flow path.

7. The heat exchanger system of claim 6, wherein, in the cross section, the oil flow path is substantially centered on the axis; and
   wherein the fuel flow path surrounds a majority of the oil flow path.

8. The heat exchanger system of claim 5, wherein, in the cross section, the oil flow path includes at least one flat side; and
   wherein, in the cross section, the fuel flow path is disposed between the outer surface and the at least one flat side.

9. The heat exchanger system of claim 1, wherein the oil flow inlet includes an oil input line that merges into the first end of the elongate flow structure and the oil flow outlet includes an oil output line that branches from the second end of the elongate flow structure; and wherein the fuel flow inlet includes a fuel input line that merges into the second end and the fuel flow outlet includes a fuel output line that branches from the first end.

10. A heat exchanger system for cooling a first fluid of an apparatus, the heat exchanger comprising:
a core structure including an elongate flow structure, the elongate flow structure extending along an axis between a first end and a second end, the elongate flow structure being arranged into a plurality of runs along a first direction into rows and in a second direction into a plurality of stacked layers as the elongate flow structure extends between the first end and the second end, the first direction being orthogonal to the second direction, the plurality of runs defining an outer profile of the core structure, the elongate flow structure defining at least one opening between the plurality of adjacent runs and through the core structure, the core structure defining a third direction that is orthogonal to the first direction and the second direction, the first end and the second end separated along the second direction and the third direction;
a first fluid flow path included in the elongate flow structure, the first fluid flow path extending continuously along the axis and through the plurality of runs from the first end to the second end, the first fluid flow path configured to receive a flow of the first fluid from the apparatus via a first inlet disposed at the first end, the first fluid flow path configured to deliver the flow of the first fluid to a first outlet disposed at the second end;
a fuel flow path included in the elongate flow structure, the fuel flow path extending continuously along the axis and through the plurality of runs from the second end to the first end, the fuel flow path configured to receive a fuel flow from a fuel flow inlet at the second end and deliver the fuel flow to a fuel flow outlet at the first end, the fuel flow and the first fluid flow path being thermally coupled and separated by a common wall of the elongate flow structure to allow the fuel flow to receive heat from the first fluid in the first fluid flow path before flowing to the apparatus;
a supplemental airflow path defined along the second direction through the core structure and between the plurality of runs via the at least one opening, the supplemental airflow path configured to receive an airflow for receiving heat from at least one of the flow of the first fluid and the fuel flow; and
a control system configured to selectively vary the airflow according to a characteristic of at least one of the flow of the first fluid and the fuel flow.

11. The heat exchanger system of claim 10, wherein the elongate flow structure includes an outer surface;
wherein the outer surface at least partly defines the supplemental airflow path; and
wherein, in a cross section of the elongate flow structure, the fuel flow path is disposed between the outer surface and the first fluid flow path.

12. The heat exchanger system of claim 11, wherein, in the cross section, the fuel flow path at least partly surrounds the first fluid flow path.

13. The heat exchanger system of claim 12, wherein, in the cross section, the first fluid flow path is substantially centered on the axis; and
wherein, in the cross section, the fuel flow path surrounds a majority of the first fluid flow path.

14. The heat exchanger system of claim 11, wherein, in the cross section, the first fluid flow path includes at least one flat side; and
wherein, in the cross section, the fuel flow path is disposed between the outer surface and the at least one flat side.

15. The heat exchanger system of claim 10,
wherein the plurality of runs are substantially linear and are joined by a plurality of respective turns of the elongate flow structure.

16. The heat exchanger system of claim 10, further comprising:
a turbulator that projects into the first fluid flow path, the turbulator configured to divert flow of the first fluid.

17. The heat exchanger system of claim 10, further comprising a sensor configured to detect the characteristic;
further comprising an actuator configured to actuate a valve member to vary the mass flow rate of the airflow;
wherein the control system is configured to selectively actuate the valve member based on the characteristic detected by the sensor.

18. The heat exchanger system of claim 10, further comprising a flow straightener disposed in the first fluid flow path.

19. The heat exchanger system of claim 10, wherein the first inlet includes a first input line that merges into the first end of the elongate flow structure and the first outlet includes a first output line that branches from the second end of the elongate flow structure; and
wherein the fuel flow inlet includes a fuel input line that merges into the second end and the fuel flow outlet includes a fuel output line that branches from the first end.

* * * * *